Sept. 13, 1932.  H. A. KNOX  1,877,135
BELT
Filed March 5, 1930   2 Sheets-Sheet 1
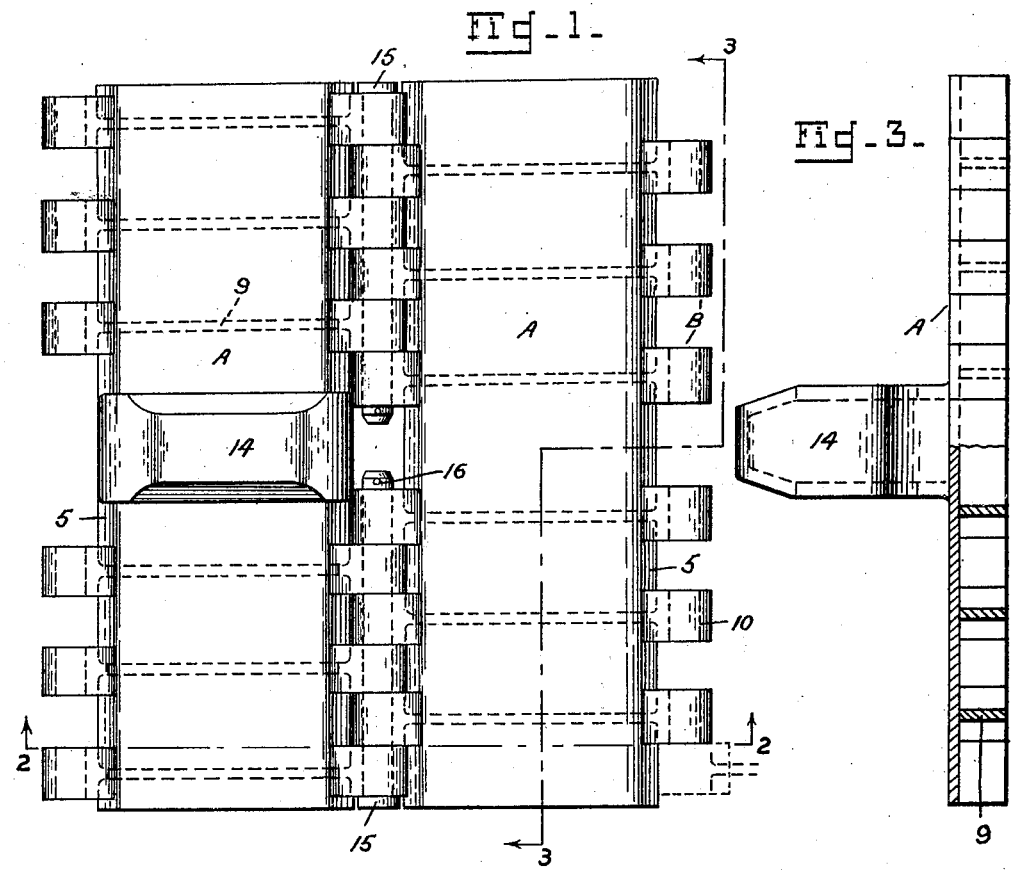
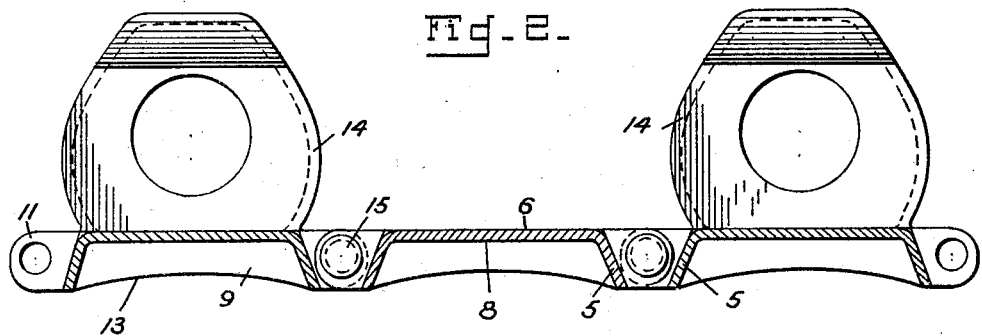
INVENTOR.
Harry A. Knox
BY
ATTORNEY Sept. 13, 1932.  H. A. KNOX  1,877,135
BELT
Filed March 5, 1930   2 Sheets-Sheet 2
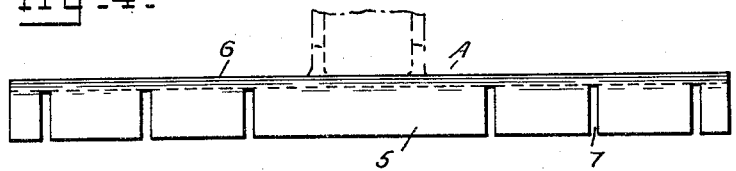
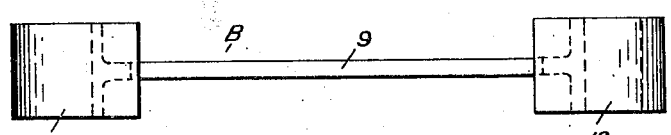
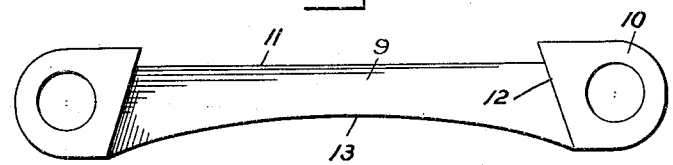
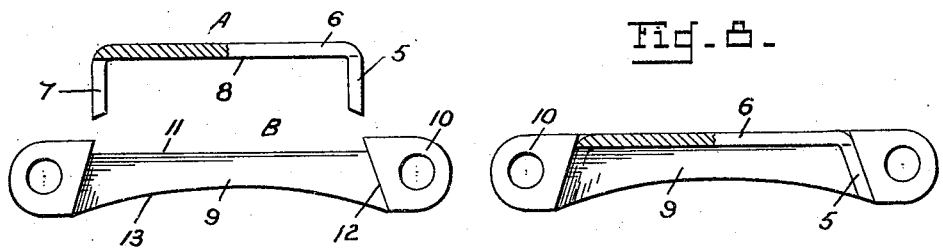
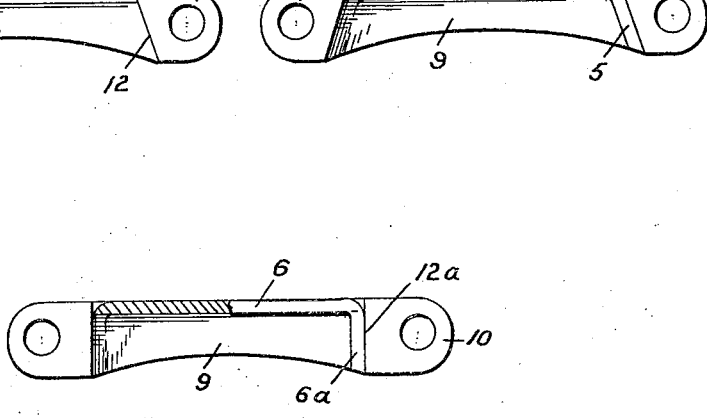
INVENTOR.
Harry A. Knox
BY
ATTORNEY Patented Sept. 13, 1932

1,877,135

UNITED STATES PATENT OFFICE

HARRY A. KNOX, OF DAVENPORT, IOWA

BELT

Application filed March 5, 1930. Serial No. 433,421.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a belt especially applicable as a track for track-laying vehicles.

One of the most important considerations entering into the development of high-speed track-laying vehicles involves the provision of a track which will be sufficiently light in weight so as not to demand increased power or impose an undue burden on the power, and one which will be sufficiently strong to hold up under the severe usage to which it is subjected at high speed.

The joint track has been in practically universal use in vehicles of this type but upon the demand for greater speeds the trend of development was directed to the jointless band track in the interest of light weight, it being generally conceded that any increase in weight in the joint track to supply the requisite strength was unwarranted. Up to the present time the jointless track has failed to give satisfactory mileage.

The purpose of the present invention is to provide a joint track with links of minimum weight and maximum strength and this end is accomplished by forming the component parts of a link section of different classes or grades of metal, each appropriate to the particular function assigned to it by virtue of its relation to the assembly. In order to reduce the number of component parts, the component part made of strong, wear-resisting metal is made to perform all the duties requiring that character of metal, while the component part made of weaker, softer metal is made to perform all the duties which may be performed by parts constructed of that character of metal.

The link element and the shoe element of each section are of the same height and in order that the assembled height will be no greater than the height of the constituent elements they are associated in an interlocking relation which enables the track pull to be taken by the link element. The disposition of the shoe element with respect to the link element is so ordered that it provides a broad rail for the supporting wheels and a cupped tread which acts to compact the ground.

With the foregoing and other object in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a plan view of a portion of the lower flight of a track constructed in accordance with the invention;

Fig. 2 is a view taken on the line 2—2 of Fig. 1;

Fig. 3 is a view taken on the line 3—3 of Fig. 1;

Fig. 4 is a view in end elevation of the shoe;

Figs. 5 and 6 are respectively views in plan and side elevation of the link element of a track section;

Fig. 7 is a view in side elevation preliminary to assembly of the shoe and links, the shoe shown partly in section;

Fig. 8 is a similar view after assembly;

Fig. 9 is a view in side elevation, parts in section, of a modified form of the track section.

Referring to the drawings by characters of reference:

The track chain comprises a series of articulated sections, all identical and each consisting of a shoe A and a plurality of laterally spaced links B.

The shoe is in the form of a channel plate having side walls 5 which may be of the same thickness as the web 6 and which are disposed transversely of the track. The web 6 constitutes a rail for the supporting wheels of a vehicle while the channel of the shoe constitutes the outer ground engaging tread of the endless track. The side walls 5—5 are provided with aligned kerfs 7 terminating in prolongation of the inner face 8 of the web for a purpose which will presently appear.

Each link B consists of a thin web 9 terminating in broad bearings 10 which rise above the upper straight edge 11 of the web a distance equal to the thickness of the web 6 of the shoe.

In the preferred embodiment of the invention illustrated in Figs. 1 to 8 the inner adjacent faces 12 of the bearings 10 are oppositely inclined to act as a support for divergent side walls of the channel plate when the links are assembled to the shoe. To permit assembling, the side walls are initially formed parallel (Fig. 7) so that the links may be slipped into the kerfs and the side walls are then pressed outwardly to engage the inclined faces 12 of the bearing.

Where the metal of the shoe is cast or not readily susceptible to bending, the side walls 6a may be parallel as in Fig. 9 and in this case the inner faces 12a of the bearing will also be parallel.

In either event the engagement between the webs of the link and the shoe and the engagement between the bearings and the side walls will provide a considerable area to enable a strong connection to be made between the elements as by welding.

The lower edge 13 of the web 11 of the link is preferably arcuate so that when travelling over hard surfaces it will be clear thereof and the bearings on the links and the edges of the side walls will take the load. In soft ground the web of the link will cut its way into ground to prevent side slipping and a pair of the links will cooperate with the shoe to form a pocket to insure compacting of the ground. This compacting will be more pronounced when the side walls of the channel plate are divergent.

The shoes or certain of the shoes are each provided centrally with an upstanding lug 14 which serves in the usual manner as a driving lug and as a guide when twin supporting wheels are employed.

The sections of the track are connected by links pins 15 inserted through the bearings and where the track is of considerable width as in the present instance, a pair of the link pins are employed at each joint, being inserted from the outer side and secured by cotter pins 16.

By virtue of the arrangement herein set forth, the link pins are directly connected in series to form a chain. The drive after being transmitted by the engaged driving lugs to the links of the corresponding track-sections will thereafter be communicated through the links of the remaining sections without any strain being imparted to the shoes of such sections. This is of particular advantage in passing over obstacles as breakage of the track is usually attributable to this cause rather than to the drive from the sprocket. The links being also obliged to sustain the major portion of the load when travelling on hard surfaces are preferably formed of a stronger, more wear-resisting metal than the metal of the shoes. For example, the links may be of high grade steel which can be treated to impart physical properties appropriate to its employment while the shoes may be made of an ordinary grade steel. This selection of special metals appropriate to the particular conditions of service enables the weight of the track to be reduced by one-half.

The interlocking arrangement of the link and shoe elements provides an especially strong and well supported track section and as this arrangement enables the assembled height to be not in excess of the height of the component members, a compact unit is established which will increase rigidity without impairing flexibility of the track as a whole.

I claim:

1. A track for track-laying vehicles embodying articulated sections, each section consisting of a channel plate having diverging side walls provided with a plurality of aligned kerfs, and a plurality of links inserted in the aligned kerfs of the side walls of the channel plate and engaging the web thereof, enlarged bearings on each end of the links engaging the outer face of the corresponding side wall of the channel plate and constituting ground engaging cleats, the assembled height being no greater than the height of the component members and the links composed of a metal of higher quality than the metal of the channel plate.

2. A track for track-laying vehicles embodying articulated sections, each section consisting of a channel plate having side walls provided with a plurality of aligned kerfs, and a plurality of links inserted in the aligned kerfs of the side walls of the channel plate and engaging the web thereof, and bearings on each end of the links engaging the outer face of the corresponding side wall of the channel plate, the assembled height being no greater than the height of the component members.

3. A track for track-laying vehicles embodying articulated sections, each section consisting of a channel plate having side walls provided with a plurality of aligned kerfs, and a plurality of links inserted in the aligned kerfs of the side walls of the channel plate and engaging the web thereof, and bearings on each end of the links engaging the outer face of the corresponding side wall of the channel plate.

4. A track embodying articulated sections, each section consisting of a channel plate with diverging side walls, link members extending across the channel and engaging the web of the channel plate, and a bearing on each end of the links engaging the outer face of the corresponding side wall of the channel plate.

5. A track embodying articulated sections, each section consisting of a channel plate, link members extending across the channel and engaging the web of the channel plate, and a bearing on each end of the links engaging the outer face of the corresponding side wall of the channel plate.

6. A track embodying articulated sections, each section consisting of a channel plate, link members extending across the channel, and a bearing on each end of the links engaging the outer face of the corresponding side wall of the channel plate.

7. A track embodying articulated sections, each section consisting of a channel plate with the channel as the outer tread, link members extending across the channel and through the walls of the channel and having a bearing on each end disposed on the outer side of the corresponding wall of the channel plate.

8. A track embodying articulated sections, each section comprising links and a transversely channeled shoe arranged in interfitting relation, the assembled height being no greater than the height of any component member.

9. A track embodying articulated sections, each section including a transversely channelled shoe with the channel as the outer tread and laterally spaced members extending across the channel whereby pockets are provided on the tread of the shoe.

10. A track embodying articulated sections, each section including a transversely channelled shoe, link members having a bearing at each end engaging the outer faces of the corresponding channel wall, and a pivot pin insertable in the bearings.

11. A track embodying articulated sections, each section comprising links having widened end bearings constituting primary ground-engaging cleats, and a shoe carried by the links and disposed within the ground-engaging cleats to constitute secondary ground-engaging members for soft ground.

12. A track comprising an endless chain of connected link sections, a plurality of links in each section and a transversely channeled shoe mounted on each link section from the inside of the endless chain, the channel being disposed outwardly for ground-engagement, and the web of the channeled shoe being substantially flush with the inner faces of the ends of the links and constituting a rail.

13. A track comprising an endless chain of connected link sections, a plurality of links in each section and a transversely channeled shoe straddling on each link section from the inside of the endless chain, the channel being disposed outwardly for ground-engagement.

HARRY A. KNOX.